July 13, 1954
G. KLEMT ET AL
2,683,396
OPTICAL OBJECTIVE SYSTEM OF THE GAUSS TYPE
COMPRISING FOUR AIR-SPACED MEMBERS
Filed Jan. 5, 1952
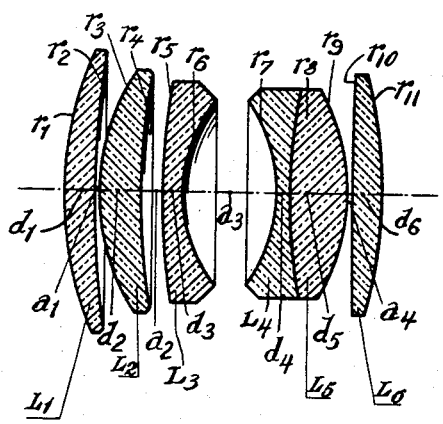
INVENTORS:
GÜNTER KLEMT
KARL H. MACHER
BY
Karl F. Ross
AGENT Patented July 13, 1954

2,683,396

UNITED STATES PATENT OFFICE 2,683,396

OPTICAL OBJECTIVE SYSTEM OF THE GAUSS TYPE COMPRISING FIVE AIR-SPACED MEMBERS

Günter Klemt and Karl Heinrich Macher, Kreuznach, Germany, assignors to Jos. Schneider & Co., Kreuznach, Germany Application January 5, 1952, Serial No. 265,092

Claims priority, application Germany April 30, 1951

2 Claims. (Cl. 88—57)

The present invention relates to an optical system constructed along the lines of the well-known Gaussian dual objective and adapted for both the taking and the reproduction of pictures.

The known objectives of the type referred to consist, generally, of two meniscus-shaped dispersive members, preferably cemented, which between them enclose the diaphragm space, the concave faces of these members facing said diaphragm space. These two inner members are, in turn, positioned between two collective members, one each on the side of the incoming and of the outgoing rays, the forward one of these latter members (seen from the side of the longer light rays) being distinctly meniscus-shaped. The centers of curvature of the refractive surfaces, with the possible exception of the cemented surfaces and of the inner face of the second collective member, are located at the side of the diaphragm. An elementary system of this description thus consists of six lenses, such objectives having been known for some time for aperture ratios ranging from about 1:3.3 to 1:1.4. Modifications arrived at by adding further lenses at the front and/or the rear assembly, by double cementing and/or by the separation of compounded lenses have also been proposed.

The primary object of the present invention is to provide an optical system of this general character having improved corrective power for sphero-chromatic aberration of rays incident parallel or inclined to the optical axis, astigmatism, image field curvature and other distortion. More particularly, it is an object of this invention to provide an improved objective having a dispersive meniscus-shaped member positioned both in front and in back of the diaphragm space in the known manner, each of these members being of the compound type with the forward one (in the direction of the longer light rays) uncemented and the rear one cemented, this set of members being, in turn, inserted between a front and a rear collective member of which the first is distinctly and the second at least roughly meniscus-shaped.

It has been found, in accordance with the invention, that in an objective as hereinabove set forth the residual coma and spherical aberration vary with the refractive index of the glass used in the various lenses, these distorting influences being the less noticeable the higher the refractive index of the glass. A feature of the invention, accordingly, resides in the use of a lens material for all the lenses of the system whose refractive index for the yellow helium line is greater than 1.62, with the refractive index of the first (forward) element of the first dispersive member, i. e. the lens immediately following the first collective meniscus, greater than 1.67, the difference between the refractive indices of said element and of the lens immediately following same being in excess of 0.05.

It has also been found that for the purpose of flattening the image field and of favorably controlling the upper coma rays the radii of the first (uncemented) dispersive meniscus, positioned ahead of the diaphragm space, should preferably be so dimensioned that the ratio between the lengths of the outer front radius and of the outer radius lies between 1.4 and 1.6 while at the same time the length of said outer front radius exceeds 0.4 times the overall focal length of the system; it has also been found desirable so to dimension the inner radii of the two elements of the first dispersive meniscus, i. e. the radii of the opposite surfaces of the uncemented compound lenses forming said meniscus, that the length of the first (forward) one of said radii ranges from 0.7 to 1.0 times the length of the second one, each of these radii having a length substantially greater than the overall focal length of the system.

A preferred embodiment of the invention has been illustrated, somewhat schematically, in the sole figure of the accompanying drawing.

As shown in the drawing, the objective according to the invention comprises a first collective meniscus consisting of a simple lens $L_1$ having a thickness $d_1$ and radii of curvature $r_1$, $r_2$; a first dispersive meniscus spaced from lens $L_1$ by a distance $a_1$ and consisting of two uncemented lenses $L_2$ (thickness $d_2$) and $L_3$ (thickness $d_3$), spaced from each other by a distance $a_2$ and having radii $r_3$, $r_4$ and $r_5$, $r_6$, respectively; a second dispersive meniscus consisting of two cemented lenses $L_4$ (thickness $d_4$) and $L_5$ (thickness $d_5$), having radii $r_7$, $r_8$ and $r_9$, the air space $a_3$ between this member and the lens $L_3$ serving to receive the diaphragm (not shown) in a manner well known per se; and a second collective member consisting of a simple, roughly meniscus-shaped lens $L_6$ having a thickness $d_6$ and radii of curvature $r_{10}$, $r_{11}$, the spacing between the lenses $L_5$ and $L_6$ being indicated at $a_4$.

Representative values (in millimeters) of the parameters indicated in the drawing (radii $r$, thicknesses $d$ and distances $a$) have been given, by way of example, in the following table, the overall focal length (with respect to the yellow helium line) being $f=100$ mm. Also indicated in the table are the indices of refraction $n_d$ for the yellow helium line and the Abbé numbers $V_d$ for the respective lenses $L_1$–$L_6$. An aperture ratio of 1:2 has been assumed.

| | | | $n_d$ | $V_d$ |
|---|---|---|---|---|
| $r_1 = + 69.79$ | $d_1 = 6.61$ | $L_1$ | 1.6230 | 58.1 |
| $r_2 = +222.62$ | | | | |
| | $a_1 = 0.21$ | air space | | |
| $r_3 = + 43.53$ | $d_2 = 8.81$ | $L_2$ | 1.6779 | 55.3 |
| $r_4 = +158.60$ | | | | |
| | $a_2 = 3.57$ | air space | | |
| $r_5 = +198.03$ | $d_3 = 3.84$ | $L_3$ | 1.6254 | 35.6 |
| $r_6 = + 28.98$ | | | | |
| | $a_3 = 18.35$ | air space | | |
| $r_7 = - 31.20$ | $d_4 = 2.28$ | $L_4$ | 1.6261 | 39.1 |
| $r_8 = +133.80$ | | | | |
| | $d_5 = 11.45$ | $L_5$ | 1.6385 | 55.5 |
| $r_9 = - 40.95$ | | | | |
| | $a_4 = 0.21$ | air space | | |
| $r_{10} = +221.94$ | $d_6 = 6.46$ | $L_6$ | 1.6385 | 55.5 |
| $r_{11} = - 84.30$ | | | | |
| total axial length = 61.79 | | | | |

It will be noted from the foregoing table that the objective dimensioned in accordance therewith and illustrated in the drawing consists of six lenses all of which have a refractive index greater than 1.62, that of the lens $L_2$ being greater than 1.67 and the difference between the refractive indices of the lenses $L_2$, $L_3$ being 0.0525, thus in excess of 0.05. The length of radius $r_3$ is about 1.5 times that of radius $r_6$, the ratio of these outer radii being thus between 1.4 and 1.6, radius $r_3$ with a length of 43.53 being at the same time greater than 0.4 times the overall focal length $f$ but less than said length $f$ which is 100 mm. It will also be seen that the inner radii $r_4$ and $r_5$ have lengths of 158.60 and 198.03, respectively, being thus appreciably greater than the overall focal length although less than 2.5 times said focal length, while the length of radius $r_4$ lies between 0.7 and 1.0 times that of radius $r_5$.

It should be understood that departures from the specific arrangement illustrated and from the precise values given above are permissible without departing from the spirit and scope of the invention as defined in the appended claims.

What is claimed is:

1. An optical objective system of the Gaussian type, comprising an outer pair of collective, at least roughly meniscus-shaped members and an inner pair of dispersive meniscus-shaped members, the members of each pair having their convex sides averted from each other, all of said members being air-spaced from one another, the first member of said inner pair consisting of two uncemented, air-spaced lenses, the second member of said inner pair consisting of a pair of lenses cemented together, each of said outer members and each of said lenses consisting of a lens material having a refractive index for the yellow helium line greater than 1.62, the refractive index of the first of said uncemented lenses being greater than 1.67, the difference between the refractive indices of said first and of the second of said uncemented lenses being greater than 0.05, the ratio of the outer radius of said first uncemented lens to the outer radius of said second uncemented lens being between 1.4 and 1.6, the outer radius of said first uncemented lens being greater than 0.4 times the overall focal length of the system but less than said focal length, the inner radius of said first uncemented lens having a length between 0.7 and 1.0 times that of the inner radius of said second uncemented lens, each of said inner radii having a length substantially greater than said overall focal length but less than 2.5 times said overall focal length.

2. An optical system according to claim 1 wherein each member of said outer pair is a simple lens $L_1$, $L_6$, respectively, the radii $r_1$, $r_2$ of the first outer lens $L_1$, the radii $r_3$, $r_4$ of the first uncemented lens $L_2$, the radii $r_5$, $r_6$ of the second uncemented lens $L_3$, the radii $r_7$, $r_8$ of the first cemented lens $L_4$, the radii $r_8$, $r_9$ of the second cemented lens $L_5$ and the radii $r_{10}$, $r_{11}$ of the second outer lens $L_6$, the axial thicknesses $d_1$, $d_2$, $d_3$, $d_4$, $d_5$ and $d_6$ of said lenses, the air spacings $a_1$, $a_2$, $a_3$ and $a_4$ between said lenses other than between said cemented lenses, the refractive indices $n_d$ of said lenses and the Abbé numbers $V_d$ of said lenses have substantially the numerical values given in the following table, the overall focal length of the system for the yellow helium line having the numerical value of 100 with an aperture ratio of substantially 1:2:

Lens $L_1$: $r_1 = +69.79$, $r_2 = +222.62$, $d_1 = 6.61$,
$\qquad n_d = 1.6230$, $V_d = 58.1$
Air space $a_1 = 0.21$
Lens $L_2$: $r_3 = +43.53$, $r_4 = +158.60$, $d_2 = 8.81$,
$\qquad n_d = 1.6779$, $V_d = 55.3$
Air space $a_2 = 3.57$
Lens $L_3$: $r_5 = +198.03$, $r_6 = +28.98$, $d_3 = 3.84$,
$\qquad n_d = 1.6254$, $V_d = 35.6$
Air space $a_3 = 18.35$
Lens $L_4$: $r_7 = -31.20$, $r_8 = +133.80$, $d_4 = 2.28$,
$\qquad n_d = 1.6261$, $V_d = 39.1$
Lens $L_5$: $r_8 = +133.80$, $r_9 = -40.95$, $d_5 = 11.45$,
$\qquad n_d = 1.6385$, $V_d = 55.5$
Air space $a_4 = 0.21$
Lens $L_6$: $r_{10} = +221.94$, $r_{11} = -84.30$, $d_6 = 6.46$,
$\qquad n_d = 1.6385$, $V_d = 55.5$.

References Cited in the file of this patent

UNITED STATES PATENTS

| Number | Name | Date |
|---|---|---|
| 1,955,591 | Lee | Sept. 17, 1934 |
| 2,106,077 | Tronnier | Jan. 18, 1938 |
| 2,171,641 | Berek | Sept. 5, 1939 |

FOREIGN PATENTS

| Number | Country | Date |
|---|---|---|
| 427,008 | Great Britain | Apr. 12, 1935 |
| 665,520 | Germany | Sept. 27, 1938 |